(12) United States Patent
Amdahl et al.

(10) Patent No.: US 9,158,946 B2
(45) Date of Patent: *Oct. 13, 2015

(54) LOCKER SYSTEM USING BARCODED WRISTBANDS

(71) Applicant: Smarte Carte, Inc., St. Paul, MN (US)

(72) Inventors: Keith Louis Amdahl, Minneapolis, MN (US); Kong Meng Vang, Circle Pines, MN (US); Matthew Charles Burk, Forest Lake, MN (US)

(73) Assignee: Smarte Carte, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,347

(22) Filed: Mar. 26, 2014

(65) Prior Publication Data

US 2014/0203076 A1    Jul. 24, 2014

Related U.S. Application Data

(63) Continuation of application No. 13/933,753, filed on Jul. 2, 2013, now Pat. No. 8,714,452, which is a continuation of application No. 13/422,382, filed on Mar. 16, 2012, now Pat. No. 8,500,012.

(60) Provisional application No. 61/558,753, filed on Nov. 11, 2011.

(51) Int. Cl.
| | |
|---|---|
| *G06K 7/01* | (2006.01) |
| *G06Q 20/38* | (2012.01) |
| *G07F 5/26* | (2006.01) |
| *G07F 17/12* | (2006.01) |

(52) U.S. Cl.
CPC .............. *G06K 7/01* (2013.01); *G06Q 20/385* (2013.01); *G07F 5/26* (2013.01); *G07F 17/12* (2013.01)

(58) Field of Classification Search
CPC .... G06Q 20/385; G06Q 7/10396; G07F 5/26; G07F 17/12; G07C 9/00309; G07C 9/00912; G07C 9/00007

See application file for complete search history.

(56) References Cited

U.S. PATENT DOCUMENTS

| | | | |
|---|---|---|---|
| 3,715,570 A | | 2/1973 | Weichselbaum et al. |
| 4,088,873 A | | 5/1978 | Kinoshita et al. |
| 4,204,635 A | | 5/1980 | Hofmann et al. |
| 4,894,717 A | * | 1/1990 | Komei .......................... 348/150 |
| 5,126,732 A | * | 6/1992 | Mardon ....................... 340/5.33 |

(Continued)

FOREIGN PATENT DOCUMENTS

| | | | | |
|---|---|---|---|---|
| JP | 10306637 A | * | 11/1998 | .............. E05B 49/00 |
| JP | 2003067488 A | * | 3/2003 | .............. G06F 17/60 |

(Continued)

*Primary Examiner* — Daniel Walsh
(74) *Attorney, Agent, or Firm* — Merchant & Gould P.C.

(57) ABSTRACT

A locker system includes one or more banks of electronic lockers. Each locker has a door lock that releasably retains the door in the closed position. The locker system also includes at least one barcode scanner selectively unlocks the door of at least one of the lockers. A locker manager is coupled to each of the electronic lockers via an electronic network. The locker manager stores a list of unique barcodes that are each associated with a locker rental plan including at least one locker account. Each locker account includes an activation indication, a use indication, a locker type indication, and a duration. The unique barcodes are printed or otherwise included on wristbands, which may be scanned at the barcode scanner to gain access to one or more of the lockers.

15 Claims, 11 Drawing Sheets

(56) References Cited

U.S. PATENT DOCUMENTS

| | | | |
|---|---|---|---|
| 5,231,272 A * | 7/1993 | Mardon | 235/382 |
| 5,233,343 A * | 8/1993 | Mazzoni | 340/5.33 |
| 5,291,399 A | 3/1994 | Chaco | |
| 5,609,716 A | 3/1997 | Mosher, Jr. | |
| 5,735,432 A * | 4/1998 | Stoken et al. | 221/1 |
| 5,928,082 A * | 7/1999 | Clapper, Jr. | 463/16 |
| 6,010,064 A * | 1/2000 | Umeda et al. | 235/375 |
| 6,142,368 A * | 11/2000 | Mullins et al. | 235/375 |
| 6,349,493 B1 | 2/2002 | Newman et al. | |
| 6,456,900 B1 * | 9/2002 | Kakuta | 700/233 |
| 6,480,758 B2 * | 11/2002 | Stevens | 700/244 |
| 6,694,217 B2 * | 2/2004 | Bloom | 700/215 |
| 6,715,669 B2 * | 4/2004 | Hara | 232/45 |
| 6,786,357 B2 | 9/2004 | Renard | |
| 6,791,450 B2 * | 9/2004 | Gokcebay et al. | 340/5.73 |
| 6,862,576 B1 * | 3/2005 | Turner et al. | 705/26.8 |
| 6,882,269 B2 | 4/2005 | Moreno | |
| 6,899,268 B2 * | 5/2005 | Hara | 235/382 |
| 6,918,541 B2 | 7/2005 | Knowles et al. | |
| 7,113,071 B2 * | 9/2006 | Cayne et al. | 340/5.22 |
| 7,479,891 B2 | 1/2009 | Boujon | |
| 7,760,069 B2 * | 7/2010 | Cayne et al. | 340/5.22 |
| 8,253,533 B2 * | 8/2012 | Jones | 340/5.61 |
| 8,424,716 B2 | 4/2013 | Hegan et al. | |
| 8,500,012 B2 * | 8/2013 | Amdahl et al. | 235/381 |
| 8,714,452 B2 * | 5/2014 | Amdahl et al. | 235/462.01 |
| 2001/0034263 A1 * | 10/2001 | Roberts | 463/17 |
| 2002/0027160 A1 * | 3/2002 | Hara | 235/375 |
| 2002/0035515 A1 * | 3/2002 | Moreno | 705/26 |
| 2002/0063157 A1 * | 5/2002 | Hara | 235/462.02 |
| 2002/0116289 A1 * | 8/2002 | Yang | 705/26 |
| 2002/0130172 A1 * | 9/2002 | Hara | 232/18 |
| 2002/0173875 A1 * | 11/2002 | Wallace et al. | 700/242 |
| 2002/0178074 A1 * | 11/2002 | Bloom | 705/26 |
| 2003/0006288 A1 * | 1/2003 | Hara | 235/462.14 |
| 2003/0019924 A1 | 1/2003 | Mullins et al. | |
| 2003/0025590 A1 * | 2/2003 | Gokcebay et al. | 340/5.73 |
| 2003/0042268 A1 | 3/2003 | Srinivasan et al. | |
| 2003/0047597 A1 | 3/2003 | Knowles et al. | |
| 2003/0107498 A1 * | 6/2003 | Drennan | 340/825.28 |
| 2003/0146233 A1 * | 8/2003 | Chirnomas | 221/123 |
| 2003/0159300 A1 | 8/2003 | Moss et al. | |
| 2003/0191670 A1 | 10/2003 | Hatcher et al. | |
| 2004/0056041 A1 | 3/2004 | Renard | |
| 2004/0056088 A1 | 3/2004 | Mullins et al. | |
| 2004/0084526 A1 | 5/2004 | Knowles et al. | |
| 2004/0117307 A1 | 6/2004 | Carlis et al. | |
| 2004/0186620 A1 * | 9/2004 | Chirnomas | 700/231 |
| 2004/0188010 A1 | 9/2004 | Chaoui | |
| 2004/0199284 A1 * | 10/2004 | Hara | 700/215 |
| 2004/0246096 A1 * | 12/2004 | Queenan | 340/5.61 |
| 2004/0267640 A1 * | 12/2004 | Bong et al. | 705/28 |
| 2005/0040228 A1 | 2/2005 | Mullins et al. | |
| 2005/0040932 A1 * | 2/2005 | Cayne et al. | 340/5.22 |
| 2005/0083176 A1 * | 4/2005 | Yamada | 340/5.73 |
| 2005/0103326 A1 | 5/2005 | Callahan | |
| 2005/0192834 A1 * | 9/2005 | Yates, Jr. | 705/1 |
| 2006/0071046 A1 * | 4/2006 | Roberts et al. | 225/10 |
| 2006/0077038 A1 * | 4/2006 | Hopkins et al. | 340/5.73 |
| 2006/0214805 A1 | 9/2006 | Boujon | |
| 2006/0230661 A1 | 10/2006 | Bekker | |
| 2006/0255905 A1 * | 11/2006 | Cayne et al. | 340/5.22 |
| 2006/0267727 A1 * | 11/2006 | Cayne et al. | 340/5.22 |
| 2007/0065259 A1 * | 3/2007 | Talley | 414/279 |
| 2007/0239465 A1 | 10/2007 | Le Gars | |
| 2009/0033456 A1 * | 2/2009 | Castillo et al. | 340/5.2 |
| 2009/0121832 A1 * | 5/2009 | Mullin et al. | 340/5.54 |
| 2010/0327002 A1 | 12/2010 | Hegan et al. | |
| 2011/0074541 A1 * | 3/2011 | Jones | 340/5.61 |
| 2011/0185612 A1 | 8/2011 | Waggoner | |
| 2011/0226861 A1 * | 9/2011 | Warther | 235/492 |
| 2012/0078413 A1 * | 3/2012 | Baker, Jr. | 700/232 |
| 2012/0086314 A1 * | 4/2012 | Bourke et al. | 312/109 |
| 2012/0194043 A1 * | 8/2012 | Turner et al. | 312/109 |
| 2013/0054010 A1 * | 2/2013 | Holman et al. | 700/232 |
| 2013/0066660 A1 * | 3/2013 | Kopitzke et al. | 705/5 |
| 2013/0119129 A1 * | 5/2013 | Amdahl et al. | 235/381 |
| 2013/0292468 A1 * | 11/2013 | Amdahl et al. | 235/381 |
| 2013/0307382 A1 * | 11/2013 | Garrison | 312/215 |
| 2013/0338822 A1 * | 12/2013 | Gibson et al. | 700/237 |
| 2014/0071274 A1 * | 3/2014 | Golden | 348/143 |
| 2014/0203076 A1 * | 7/2014 | Amdahl et al. | 235/381 |
| 2014/0354403 A1 * | 12/2014 | Zaniker et al. | 340/5.54 |

FOREIGN PATENT DOCUMENTS

| | | | | |
|---|---|---|---|---|
| JP | 2004137720 A | * | 5/2004 | E05B 49/00 |
| JP | 2009084837 A | * | 4/2009 | |

* cited by examiner

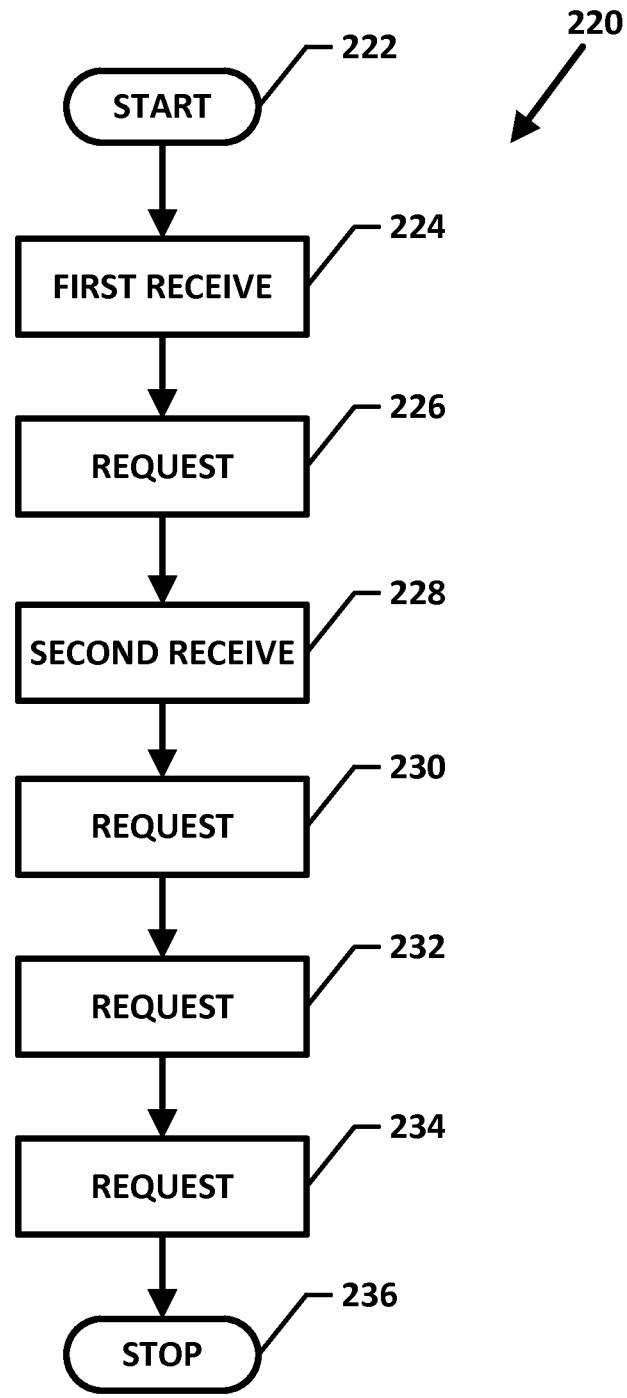

LOCKER SYSTEM USING BARCODED WRISTBANDS

CROSS-REFERENCE TO RELATED APPLICATIONS

This application is a continuation of application Ser. No. 13/933,753, filed Jul. 2, 2013, now U.S. Pat. No. 8,714,452, which is a continuation of application Ser. No. 13/422,382, filed Mar. 16, 2012, now U.S. Pat. No. 8,500,012, which claims the benefit of provisional application Ser. No. 61/558,753, filed Nov. 11, 2011, and titled "Locker System Using Barcoded Wristbands," the disclosures of which are hereby incorporated herein by reference.

BACKGROUND

Some parks (e.g., amusement parks, water parks, etc.) allow users to rent lockers in which to store valuables while the user is at the park. Some types of lockers are rented on a multiple reentry basis. For example, a user in a water park may rent a locker to store the clothes, towel, shoes, purse, wallet, or other accessories of the user. The user may want access to the items stored in the locker periodically throughout the day (e.g., to obtain a dry towel, to obtain money to buy food, etc.). Other types of lockers are rented on a single reentry basis. For example, a user in an amusement park may rent a locker associated with a particular ride to store items until the ride is over.

SUMMARY

According to some aspects of the disclosure, one example locker system includes electronic lockers that each include a door lock that is configured to releasably retain the respective door in the closed position. The locker system also includes at least one barcode scanner associated with the plurality of electronic lockers. The barcode scanner is operationally coupled to the door lock of at least one locker to selectively unlock the door. The locker system also includes a locker manager coupled to each of the electronic lockers via an electronic network. The locker manager includes a processor and memory. The memory of the locker manager stores a plurality of unique barcodes, at least some of which are each associated with a locker rental plan including at least one locker account. Each locker account includes an activation indication, a use indication, a locker type indication, and a duration. Users receive wristbands bearing a unique barcode, which is associated with a specific rental plan purchased by the user.

According to other aspects of the disclosure, one example wristband dispensing kiosk includes a kiosk housing having an input interface, a display interface, and a dispenser. A hopper is disposed in the housing. The hopper is configured to hold a plurality of wristbands. The hopper is connected to the dispenser to selectively dispense the wristbands. A barcode scanner is disposed in the housing at the dispenser. An electronic processor is coupled to the kiosk housing. The electronic processor is configured to receive an order via the input interface, to selectively dispense the wristbands via the dispenser in accordance with the order, to scan a unique barcode of each wristband using the barcode scanner as the wristband is dispensed, and to provide the scanned unique barcode from the dispensed wristband to a remote locker manager to activate the unique barcode.

According to other aspects of the disclosure, one example process of renting lockers includes scanning a barcode using a laser scanner at a locker terminal to identify a barcode number; sending a validation request from the locker terminal to a locker manager; receiving at the locker terminal a validation response from the locker manager; enabling a user to access the locker terminal if the validation response indicates that access to the locker terminal is in accordance with a locker rental plan associated with the barcode number; and displaying an error message if the validation response indicates that access to the locker terminal is not in accordance with a locker rental plan associated with the barcode number. The validation request includes the barcode number identified by the scan and an indication of locker type for the locker terminal. The validation response includes an indication of whether access to the locker terminal is in accordance with a locker rental plan associated with the barcode number.

According to other aspects of the disclosure, one example process of activating one or more barcoded wristbands for use in renting locker terminals in an electronic locker system includes receiving a rental order from a user at a kiosk. The rental order includes a selection of a locker rental plan, a selection of a number of wristbands to be associated with the locker rental plan, and payment information. The process also includes dispensing the number of wristbands; scanning the unique barcode of each wristband as the wristband is dispensed; and sending a communication to a locker manager including any scanned unique barcodes and the locker rental plan.

According to other aspects of the disclosure, the wristbands may include RFID technology or Biometric technology instead of or in addition to the barcode number. In some implementations, the kiosks will communicate the appropriate RFID or Biometric information contained in each wristband to the locker manager. In some implementations, locker banks or locker will have a scanner configured to read the RFID or Biometric information on the wristband.

BRIEF DESCRIPTION OF THE DRAWINGS

FIG. 7 is a flowchart illustrating an operational flow for one example process of activating one or more barcoded wristbands for use in renting locker terminals in an electronic locker system;

DETAILED DESCRIPTION

The disclosure is directed to systems and methods for renting lockers within a park (e.g., a water park, an amusement park, etc.). The lockers may be rented for either single re-entry or multiple re-entry use. The lockers also may be rented for various durations (e.g., one hour, two hours, half-day, full day, week-long, etc.). To access a locker, a user purchases a rental plan and receives at least one wrist band bearing a unique barcode associated with the purchased rental plan. The user scans the barcode at the locker to gain access to the locker in accordance with the rental plan.

Figure 1:
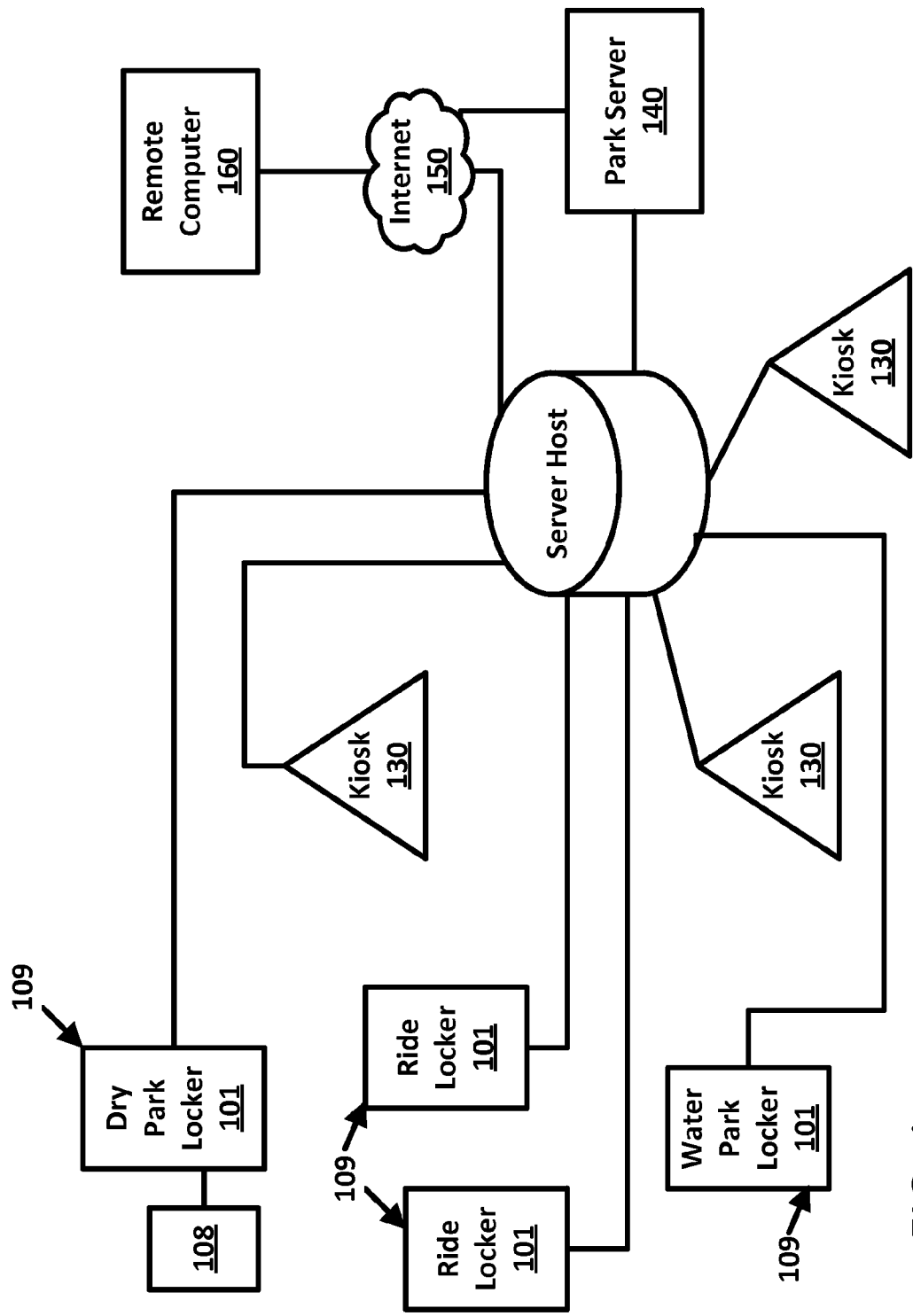
FIG. 1 is a schematic diagram of a locker rental network including a plurality of locker banks, a plurality of rental kiosks, and a locker manager.

FIG. 1 is a schematic diagram of an example locker rental network 100 including a plurality of locker banks 109, a plurality of rental kiosks 130, and a locker manager 110. The components of the locker rental network 100 are coupled together electronically. For example, in some implementations, one or more components may be coupled via cable connections (e.g., underground cables). In other implementations, one or more components may be coupled via a wireless network interface. In certain implementations, the locker rental network 100 connects to the Internet 150 (e.g., to enable users to purchase locker rental plans online).

Each locker bank 109 in the network 100 includes one or more lockers 101 and at least one barcode scanner 108. As the term is used herein, a barcode scanner 108 may include a device capable of reading a 1-D barcode, a 2-D barcode, a QR code, or any other type of visual indicia. A locker 101 is accessed by scanning a wristband 120 bearing a barcode at the barcode scanner 108. The locker 101 communicates with the locker manager 110 to determine whether access to the locker 101 is in accordance with a rental plan associated with the scanned barcode. In some implementations, the barcode scanner 101 includes a laser scanner to increase security. A laser scanner will not read an electronic picture of a barcode, such as may be displayed on a mobile phone. In other implementations, the barcode scanner 101 includes an optical scanner, a camera, or another type of sensor.

A user may use one of the kiosks 130 to obtain one or more wristbands 120 with which to access one or more lockers 101. In some implementations, the user purchases a rental plan at the kiosk 130 as will be described in more detail herein. In other implementations, the user purchases a rental plan online from a website (e.g., the park website) associated with the locker rental network 100 using a remote computer 160. For example, the website may be hosted on a server 140 coupled to the locker rental network 100. The user redeems the wristbands 120 associated with the purchased plan from the kiosk 130 after arriving in the park.

In some implementations, the user purchases a rental plan for a single user and receives a single wristband 120. In other implementations, however, the user purchases a rental plan for multiple users and each user receives a wristband 120. In certain implementations, the wristband 120 of each user bears a different barcode. In other implementations, the wristbands 120 associated with a single rental plan bear the same barcode. In some implementations, the user purchases a rental plan for a single locker 101. In other implementations, the user purchases a rental plan for multiple lockers 101. In certain implementations, the user rents multiple types of lockers 101. In certain implementations, the user rents lockers 101 having various use limitations as will be described in more detail herein.

A locker manager 110 is coupled to the electronic network 100. The locker manager 110 is configured to store a listing of activated unique barcodes 113. For example, whenever a user obtains a wristband 120 from a kiosk 130, the kiosk 130 communicates with the locker manager 110 to activate the barcode 113 on the wristband 120. The locker manager 110 also stores the various locker rental plans 114 that have been purchased by users. For example, the locker manager 110 stores the user limitations associated with each rental plan 114. The locker manager 110 associates the activated barcodes 113 to the rental plans 114. The locker manager 110 also is coupled to the locker banks 109 and/or individual lockers 101. Whenever a user attempts to access a locker 101, the locker 101 or locker bank 109 communicates with the locker manager 110 to determine whether such access is authorized.

Figure 2:
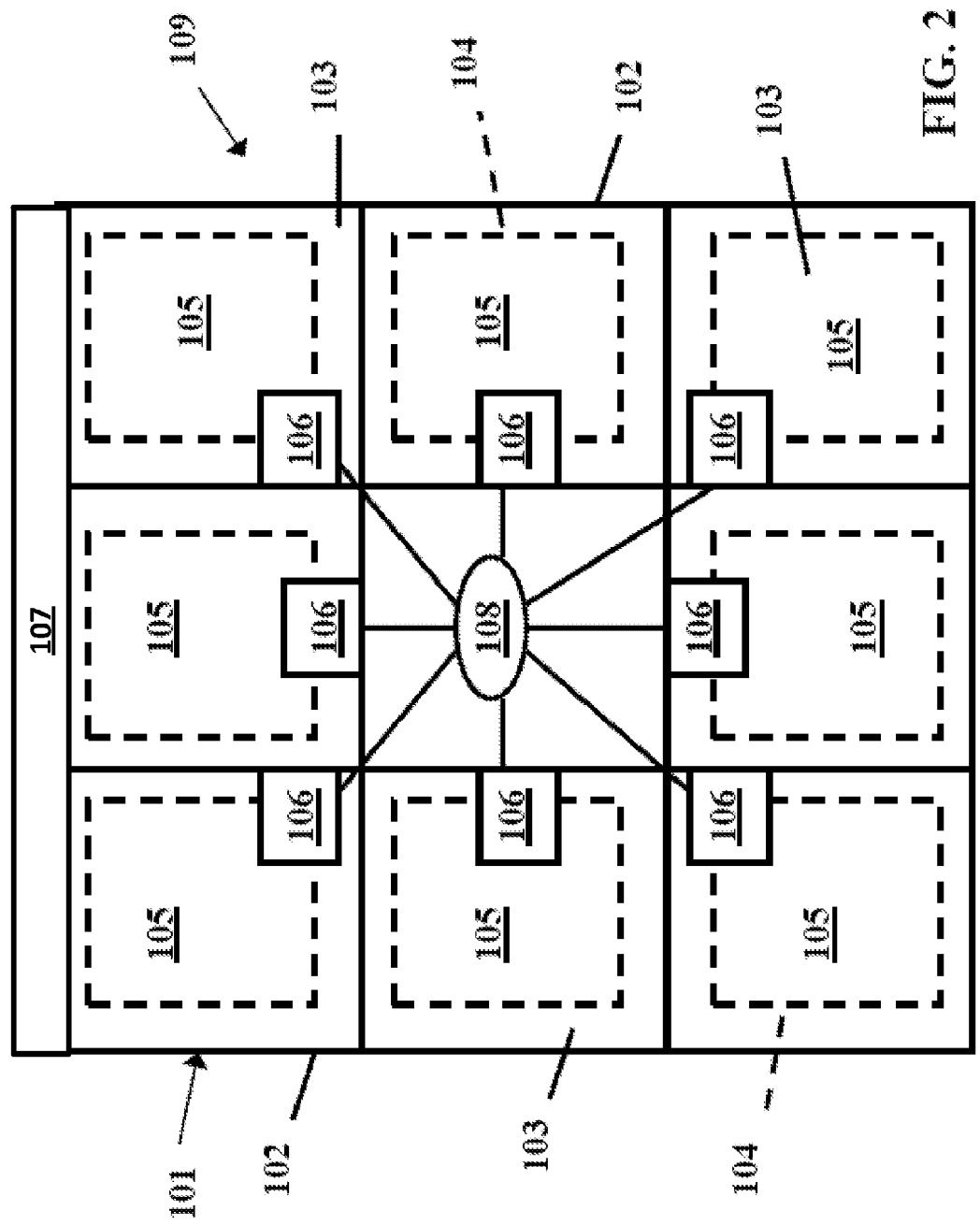
FIG. 2 is a block diagram of one example locker bank including eight lockers and a barcode scanner, each locker having a separate door lock associated with the barcode scanner.

FIG. 2 is a block diagram of one example locker bank 109 including eight lockers 101 and a barcode scanner 108. In other implementations, however, the locker bank 109 may have a greater or lesser number of lockers 101. In still other implementations, the locker bank 109 may include a greater number of barcode scanners 108. For example, in certain implementations, each locker 101 includes a corresponding barcode scanner 108.

Each locker 101 includes an enclosure 102 defining an interior 103 that is accessible through an access opening 104. Each locker 101 includes a door 105 that is configured to move between a closed position and an open position. For example, the door 105 may pivot between the open position and the closed position. The door 105 inhibits access to the enclosure interior 103 when in the closed position and the door 105 enables access to the enclosure interior 103 through the access opening 104 when in the open position. Each locker 101 also includes a door lock 106. The door lock 106 of each locker 101 is configured to releasably retain the respective door 105 in the closed position. Certain types of lockers 101 also may include a door sensor to determine whether the locker door 105 is open. Certain types of lockers 101 also may include a sensor to determine whether the locker 101 is occupied (e.g., whether any physical objects are located within the enclosure 102).

At least one barcode scanner 108 is associated with the plurality of electronic lockers 101. The barcode scanner 108 is configured to read a barcode or other visual indicia displayed (e.g. printed) on a wristband 120. The barcode scanner 108 is operationally coupled to the door lock 106 of at least one locker 101 (e.g., via the locker manager 110) to selectively unlock the door 105. In some implementations, one barcode scanner 108 is operationally coupled to the door locks 106 of multiple lockers 101 in a locker bank 109. In certain implementations, the barcode scanner 108 is operationally coupled to the door locks 106 of all of the lockers 101 in a locker bank 109. In other implementations, however, each locker 101 has its own barcode scanner 108. In one example implementation, each barcode scanner 108 includes a laser scanner.

In some implementations, the locker bank 109 may include a display 107 arrangement via which information about the locker bank 109 may be presented to users. For example, the display 107 may indicate the number of available lockers 101 at the bank 109. In some such implementations, the display 107 includes a screen (e.g., an LED screen, an LCD screen, or another type of screen) on which the number of available lockers may be projected. A map indicating the location of the available lockers 101 also may be displayed. In other implementations, each locker 101 may be equipped with an LED or other visual indicator, which may be lit to signal that the locker 101 is available. In certain implementations, the display 107 may include auditory display devices, such as speakers over which the number of available lockers 101 may be announced.

The display 107 also may present a status code for one or more lockers 101. For example, the status code may indicate whether the locker 101 is available, rented, occupied, blocked, disabled, in overtime, or in mercy time. A locker 101 is available if it is not associated with a purchased rental plan and is not necessary to fulfill a purchased rental plan (e.g., is not the only available locker of the type/size purchased). A locker 101 is rented if the locker 101 is associated with a purchased rental plan or is necessary to fulfill a purchased rental plan. In some implementations, the locker 101 is occupied if the locker 101 has been accessed under a purchased plan. In certain implementations, the locker 101 is occupied if a sensor indicates that one or more items are in the locker 101.

A locker 101 can be blocked so that the locker manager 110 will not sell the locker 101 and will not allow access to the locker 101. For example, a locker 101 may be blocked by a service attendant if the locker is determined to be in need of cleaning. A locker 101 also can be disabled if the locker 101 is determined to be malfunctioning or otherwise in need of service. A locker 101 is in overtime if the locker 101 is occupied after the duration of the associated plan has expired. A locker 101 is in mercy time if the locker 101 is occupied after the duration communicated to the user has expired, but the duration of the associated plan has not yet expired.

In some implementations, the display 107 of the locker bank 109 may identify one or more locker banks 109 that have available lockers 101. For example, when most or all of the lockers 101 at a particular locker bank 109 are in use, the display 107 of the locker bank 109 may direct users to other locker banks 109 that do have available lockers 101. In some implementations, the display 107 indicates an identity (e.g., bank number) of the other banks 109. In other implementations, the display 107 displays a map of the park and indicates the location of the other banks 109 on the map. In certain implementations, the display 107 indicates the number of lockers 101 available at the other banks 109.

In some implementations, the scanner 108, display 107, and locks 106 of the locker bank 109 are coupled to and controlled by the locker manager 110. In other implementations, the scanner 108, display 107, and locks 106 of the locker bank 109 are controlled locally by a bank managing system of the locker bay 109, which is operationally coupled to the locker manager 110 so that information may be sent between the locker manager 110 and the local bank manager. In some implementations, the local bank manager may include a slave processor that locally implements instructions received from the locker manager 110. In other implementations, the local bank manager may include a memory storing separate software from the locker manager 110 (e.g., for displaying the number of available lockers).

Figure 3:
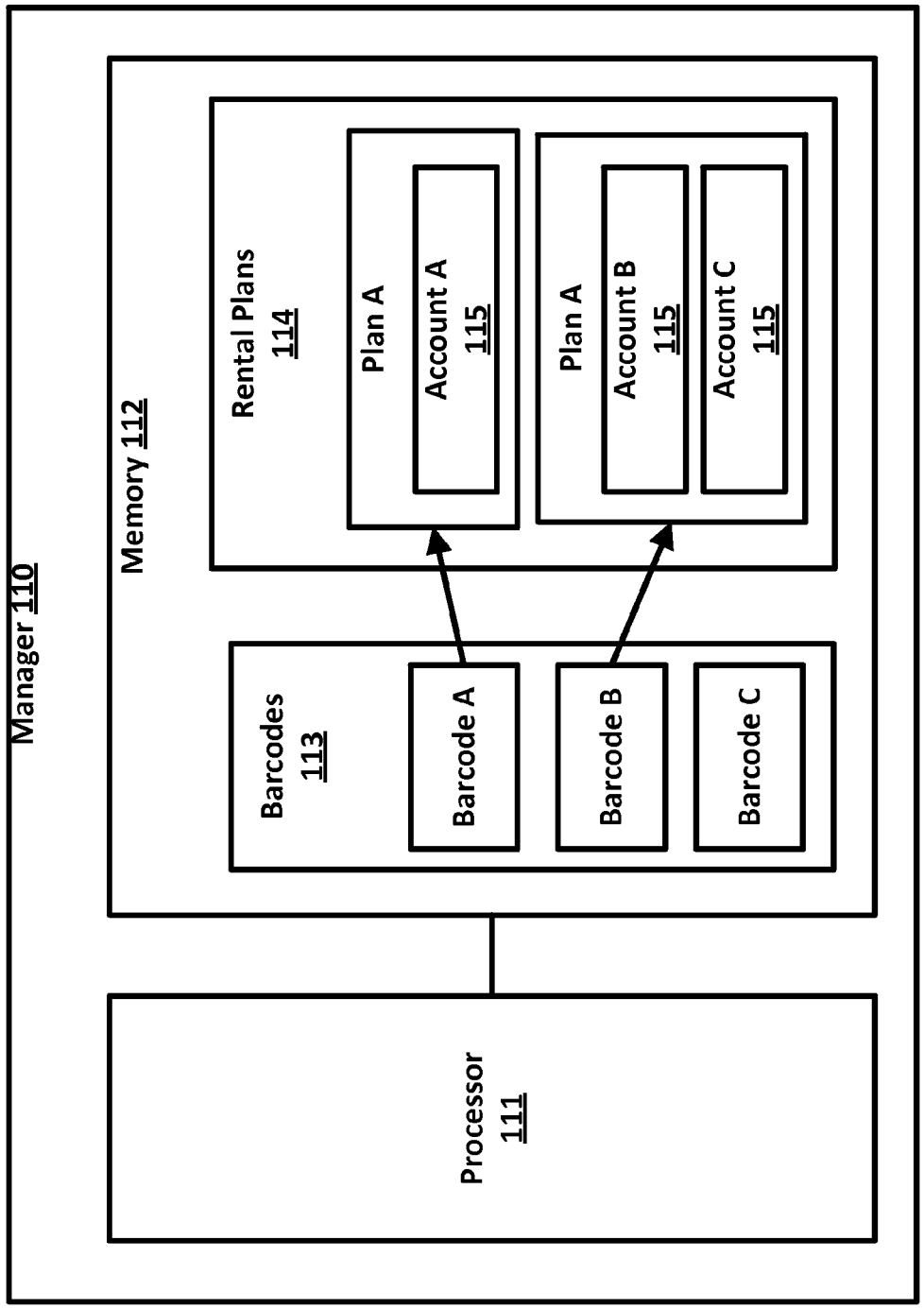
FIG. 3 is a block diagram of one example locker manager including a processor and memory for storing unique barcodes and rental plans.

FIG. 3 is a block diagram of one example locker manager 110 including a processor 111 and memory 112 for storing unique barcodes 113 and rental plans 114. The locker manager 110 couples to each of the electronic lockers 101 via the electronic network 100. The memory 112 of the locker manager 110 is configured to store a listing of unique barcodes 113. In some implementations, the locker manager 110 stores only activated unique barcodes 113. In other implementations, the locker manager 110 stores a listing of unique barcodes 113 and an indication of whether each barcode 113 has been activated.

The memory 112 of the locker manager 110 also is configured to store one or more locker rental plans 114 that have been purchased by users. The locker manager 110 associates the purchased rental plans 114 with the corresponding barcode numbers 113. Each activated barcode 113 is associated in the memory 112 of the manger 110 with at least one rental plan 114. Each rental plan 114 includes at least one locker account 115. For example, each locker 101 or type of locker 101 being rented may be associated with a separate account 115. Because a user may rent more than one locker or type of locker simultaneously, multiple accounts 115 may be associated with the same locker rental plan 114.

The processor 111 of the locker manager 110 is configured to associate each locker account 115 with a specific locker 101. For example, the processor 111 may receive a communication from one of the lockers 101 (e.g., via the electronic network 100) indicating that a user has requested access to the locker 101 by scanning a barcode. The communication may include a terminal ID 129 identifying the particular locker 101 as will be disclosed in more detail herein, the barcode number 113, and other information pertaining to the locker (e.g., the type of locker, its location within the park, etc.). The processor 111 determines whether accessing the locker 101 is in accordance with the rental plan 114 associated with the barcode number 113. The processor 111 also associates the terminal ID with the locker account 115 if the processor 111 determines that access to the locker 101 is within the scope of the rental plan 114.

Figure 4:
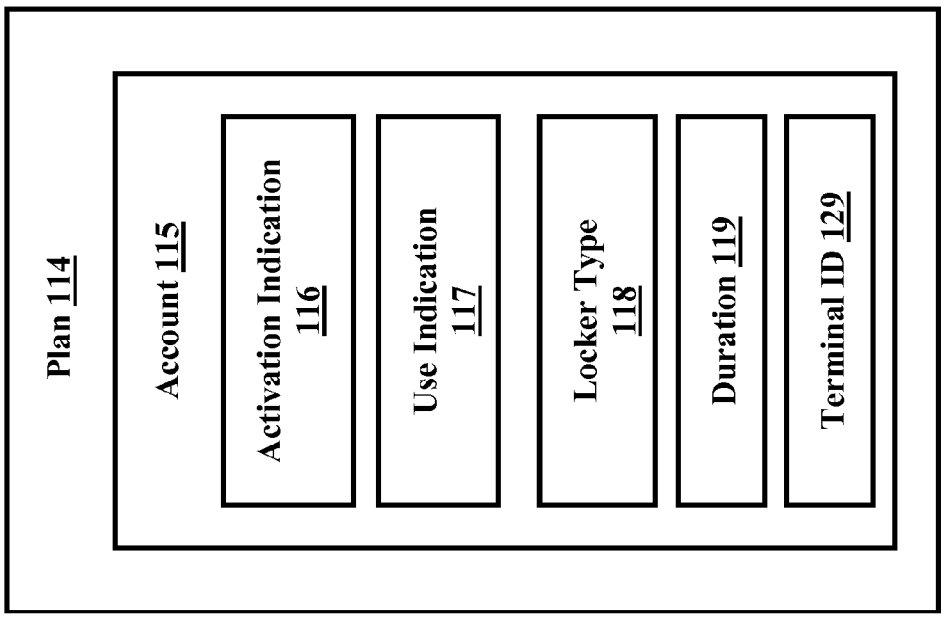
FIG. 4 is a block diagram of one example rental plan that may be stored in the memory of the locker manager in accordance with the principles of the present disclosure.

FIG. 4 is a block diagram of one example rental plan 114 that may be stored in the memory 112 of the locker manager 110. Each rental plan 114 includes one or more locker accounts 115. In certain implementations, the rental plan 114 includes a locker account 115 for each locker 101 that is rented by a user. Each locker account 115 includes an activation indication 116, a use indication 117, a locker type indication 118, and a duration 119. Each locker account 115 is eventually associated with a terminal ID 129 that identifies a particular locker 101 in the network 100. Accordingly, each locker account 115 will have its own unique terminal ID 129 associated therewith. The activation indication 116 indicates whether the user has accessed a locker in accordance with the account 115. The use indication 117 indicates whether the locker 101 is being rented for single re-entry or multiple re-entry type use.

The locker type indication 118 indicates whether the locker 101 is a ride locker, a water park locker, a general locker, or some other type of locker. The duration 119 indicates the time period over which the locker 101 may be accessed in accordance with the plan 114. For example, in the case of a multiple re-entry type locker, the duration 119 indicates whether the locker 101 is being rented for an hour, a day, a half-day, or for some other period of time. In other implementations, the duration 119 may indicate a maximum number of re-entries associated with the plan 114.

In certain implementations, when the length of time indicated by the duration indication 119 expires, the user is charged additional money to re-enter the locker 101. In the case of a single re-entry type locker, the duration 119 may indicate the length of time the user has to access the locker 101 before being charged extra. In certain implementations, the duration 119 communicated to the user is less than the duration 119 associated with the plan 114. For example, the plan 114 may include "mercy time" (e.g., five minutes, ten minutes, fifteen minutes, etc.) between when the user is told the plan 114 expires and when the user will be charged additional money. In some implementations, a service attendant may communicate with the local bank manager or locker manager 110 via an interface at the locker terminal 101 or associated bank 109 to remove overtime charges.

In some implementations, the locker rental plan 114 includes a plurality of locker accounts 115. For example, in some cases, a user may choose to rent one general locker 101 and one ride locker 101. In other cases, a user may choose to rent a water park locker 101 for the morning and a general park locker 101 for the afternoon. In still other cases, a user may be part of a group and may choose to rent multiple lockers that are each accessible by anyone in the group. In still other cases, a user may be part of a group and may choose to rent multiple lockers, some of which are accessible by select individuals in the group.

Accordingly, the limitations of one locker account 115 may differ from the limitations of another locker account 115 of the same plan 114. For example, in some implementations, at least one of the use indication 117 and the time duration 119 of a first locker account 115 may be different compared to a second locker account 115 of the same locker rental plan 114. In other implementations, two locker accounts 115 of the same plan 114 may have different locker type indications 118.

In some implementations, locker accounts 115 may be associated with privileges. For example, some locker accounts 115 (e.g., an account for a child) may include an indication that the account 115 has priority to obtain a locker close to the ground or at a lower level of a bank 109. Some locker accounts 115 (e.g., an account for a VIP or club member) may include an indication that the account 115 has priority to obtain a priority locker (e.g., a large locker or a locker in a desirable location). Other locker accounts 115 may include an indication that the account 115 is authorized to obtain a locker that meets ADA specifications. If locker accounts 115 having priority to certain types of lockers 101 have been sold, then the locker manager 110 may deny access to one or more of these types of lockers 101 by a non-priority account-holder, even if the locker 101 otherwise meets the limitations of the plan 114.

The locker manager 110 may associate multiple unique barcodes 113 with the same locker rental plan 114. In some implementations, each unique barcode 113 is associated with a unique locker account 115 of the plan 114. For example, a locker rental plan may be purchased for a group and each member of the group may receive a different locker 101. In other implementations, two or more of the unique barcodes 113 may be associated with the same locker account 115. For example, two or more members of a group (e.g., a family) may have access to the same locker 101. In some implementations, each barcode 113 is associated with only one locker account 115. In other implementations, however, each barcode 113 is associated with multiple locker accounts.

For example, one example locker rental plan 114 may include a first locker account 115 for a multiple re-entry water park locker 101 and a second locker account 115 for a single re-entry ride locker 101. The rental plan 114 may be associated with multiple barcodes 113. One of the barcodes 113 may be associated with only the first locker account 115, thereby enabling the user wearing the barcode 113 to access the water park locker 101. Another of the barcodes 113 may be associated with both the first locker account and the second locker account, thereby enabling the user to access both lockers 101.

In some implementations, the locker manager 110 may assign lockers 101 to the accounts 115 within a plan 114 in accordance with a predetermined pattern. For example, in some implementations, the locker manager 110 may assign the accounts 115 within the same plan 114 to lockers 101 that are all located in a common area (e.g., at the same bay 109). In other implementations, the locker manager 110 may assign the accounts 115 within the same plan 114 to lockers 101 that are geographically spread out (e.g., to facilitate access by inhibiting the need to access adjacent lockers 101 simultaneously).

Figure 5:
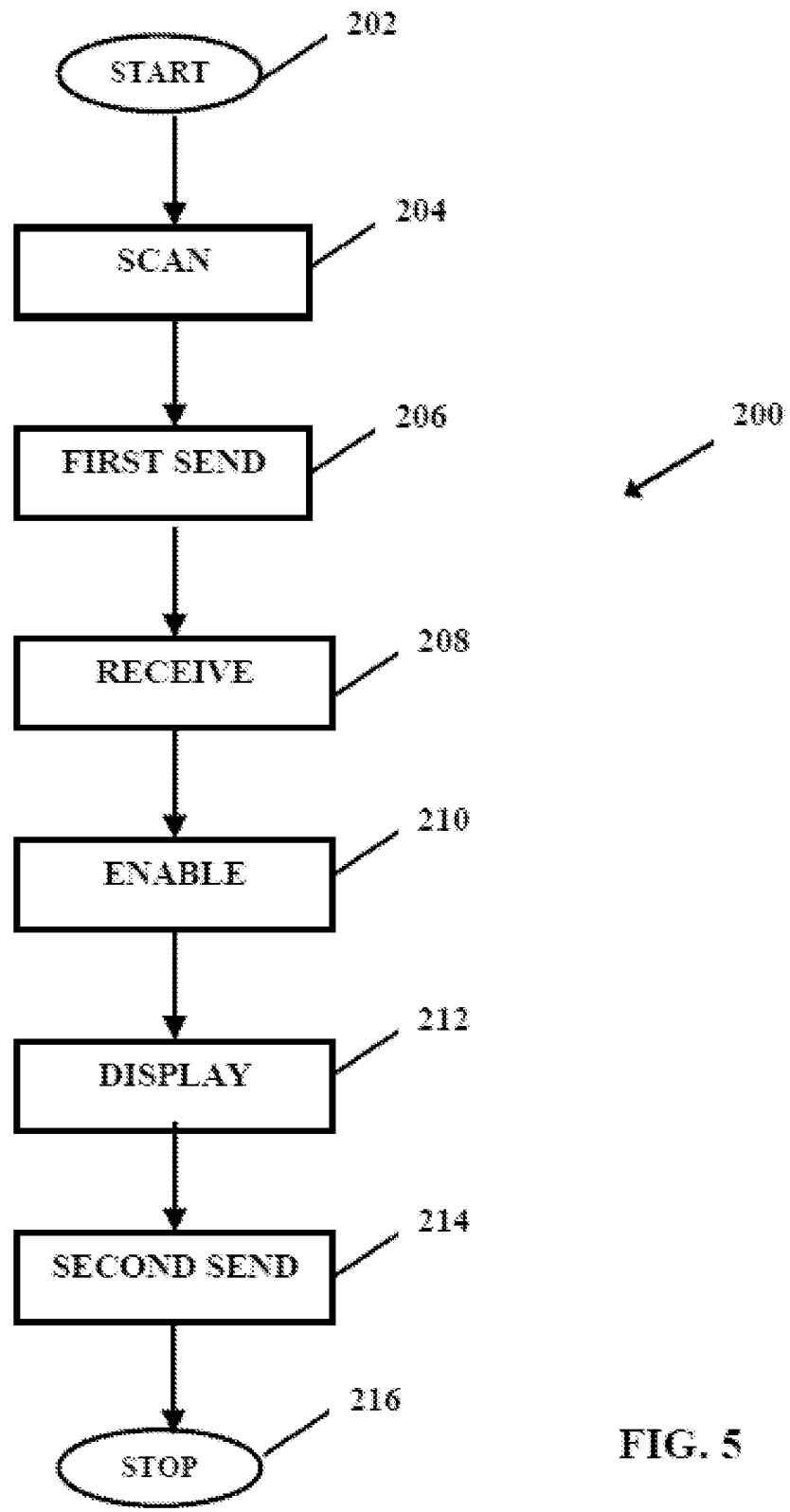
FIG. 5 is a flowchart illustrating an operational flow for one example process of renting lockers.

FIG. 5 is a flowchart illustrating an operational flow for one example process 200 of renting lockers 101. The rental process 200 begins at a start module 202, performs any appropriate initialization procedures, and proceeds to a scan operation 204. During the scan operation 204, a user scans a wristband 120 at a barcode scanner 108 of a locker bank 109. The barcode scanner 108 determines a barcode 113 associated with the wristband 120. In one example implementation, the scan operation 204 is implemented using a laser scanner 108 to identify the barcode number.

In some implementations, the user indicates to which locker terminal 101 the user is attempting to gain access. In certain implementations, each locker terminal 101 has its own barcode scanner 108. Accordingly, scanning the wristband 120 at the barcode scanner 108 indicates that the user wishes to gain access to the locker terminal 101 associated with the barcode scanner 108. In certain implementations, the barcode scanner 108 is associated with multiple lockers 101 in the bank 109. In some such implementations, a user indicates a specific locker 101 using a user interface of the barcode scanner 108. In other implementations, the user is not allowed to request a specific locker 101. Rather, the user scans a wristband at the scanner 108 and is assigned an available locker 101 in the locker bank 109.

A first send operation 206 provides a validation request (e.g., directly or via the local bank manager) to the locker manager 110. The validation request includes the barcode number identified by the scanner 108 and information pertaining to the locker terminal 101 or to the locker bank 109. For example, in some implementations, the validation request may include an indication of locker type, location, and a locker terminal ID associated with a specific locker being requested by the user. In certain implementations, the validation request includes only a locker terminal ID, from which the locker manager 110 may determine the locker type. In other implementations, the validation request includes only an indication of locker type that is associated with the locker bank 109. In still other implementations, the request includes an identity of the scanner 108 so that the locker manager 110 may look up and identify the particular locker 101 or locker bay 109 that the user is attempting to access.

Upon receiving the validation request, the locker manager 110 determines whether the code is activated (e.g., associated with a locker plan 114). If activated, then the locker manager 110 determines whether access to a locker terminal 101 in the bank 109 (or to a specific requested locker 101) is in accordance with a locker rental plan 114 associated with the scanned barcode number 113. For example, the processor 111 of the locker manager 110 retrieves the rental plan 114 using the barcode 113 provided in the validation request. The locker manager processor 111 also identifies one or more locker accounts associated with the barcode 113. The locker manager 110 may determine whether any lockers 101 have been purchased and not yet selected.

In some implementations, the processor 111 determines whether the requested locker bay 109 includes any available lockers 101 that meet the limitations of the rental plan 114 and the particular account 115 associated with the code. In other implementations, the processor 111 determines whether the type and/or size of the locker 101 identified in the validation request matches the locker type and/or size of an available account 115 (i.e., an account 115 not yet associated with another locker 101). The processor 111 also determines whether other use limitations associated with the account 115 are met (e.g., whether the access is occurring within the requisite duration, at the requisite location(s), etc.).

In some implementations, if the requested access to a locker bank 109 meets the limitations of an available account 115 of a purchased plan 114, then the locker manager 110 identifies an available locker terminal 101 within the bank 109. The locker manager 110 associates a terminal ID 129 of the available locker terminal 101 with the account 115. In other implementations, if the requested access to a particular locker 101 meets the limitations of an available account 115 of a purchased plan 114, then the locker manager 110 determines whether the requested locker 101 is available. If the requested locker 101 is available, then the locker manager 110 associates a terminal ID 129 of the requested locker 101 with the account 115.

If the locker manager 110 determines that the locker selection is appropriate under the purchased plan 114, then the locker manager 110 allows the door 105 of the selected locker 101 to be unlocked. In some implementations, the locker manager 110 is directly coupled to an electronic door lock 106 on the door 105 and releases the electronic door lock 106. In other implementations, the locker manager 110 sends a validation response to the local bank managing system to release the door lock 106. For example, if the requested access was approved, then the validation response includes the terminal ID 129 of the available locker 101. If the request for access was denied (e.g., the requested locker 101 is not available, if no lockers 101 are available in the requested locker bank 109, or if the requested access is determined to be outside the scope of the purchased plan 114), however, then the validation response includes a denial of access rights. In some implementations, the validation response includes an error code or message indicating why the denial is provided.

An enable operation 210 is implemented by the local bank managing system to unlock the door 105 of a specific locker terminal 101 at the locker bank 109 in response to receiving the validation response from the locker manager 110 that indicates that access is approved. For example, the enable operation parses the validation response for a terminal ID 129 of an available locker 101 and releases the door lock 106 of the locker 101 associated with the terminal ID 129. When the door lock 106 is released, the user is able to open the door 105 of the locker 101 to gain access to the locker interior 103. When the door 105 is closed again, the user will need to rescan the wristband 120 to gain re-entry to the locker interior 103.

A display operation 212 displays an error message to the user (e.g., via display device 107) if the validation response indicates that access to the locker terminal 101 is denied. For example, the display operation 212 may indicate to a user that the user has already accessed a different locker 101 under the account 115. Alternatively, the display operation 212 may indicate to a user that the user has rented a different type of locker 101. In some such implementations, the display operation 212 may provide information (e.g., a map, text, etc.) indicating where the type of locker rented by the user may be located. Alternatively, the display operation 212 may indicate that all lockers 101 in the bank 109 are currently being used. In some such implementations, the display operation 212 may display information (e.g., a map, text, etc.) informing the user where an available locker 101 is located.

In some implementations, the locker 101 or locker bank 109 may send a transaction confirmation to the locker manager during a second send operation 214 to indicate that the locker terminal 101 has been accessed. In certain implementations, the transaction confirmation includes the locker terminal ID 129 and the barcode number 113. For example, in some implementations, the locker manager 110 doesn't associate the locker terminal ID 129 with the account 115 associated with the scanned barcode 113 until the transaction confirmation is received. In other implementations, the locker manager 110 preliminarily associates the terminal ID 129 and the account 115 in response to the validation request and finalizes the association when the transaction confirmation is received.

The rental process 200 performs any appropriate completion procedures and ends at a stop module 216.

Figure 6:
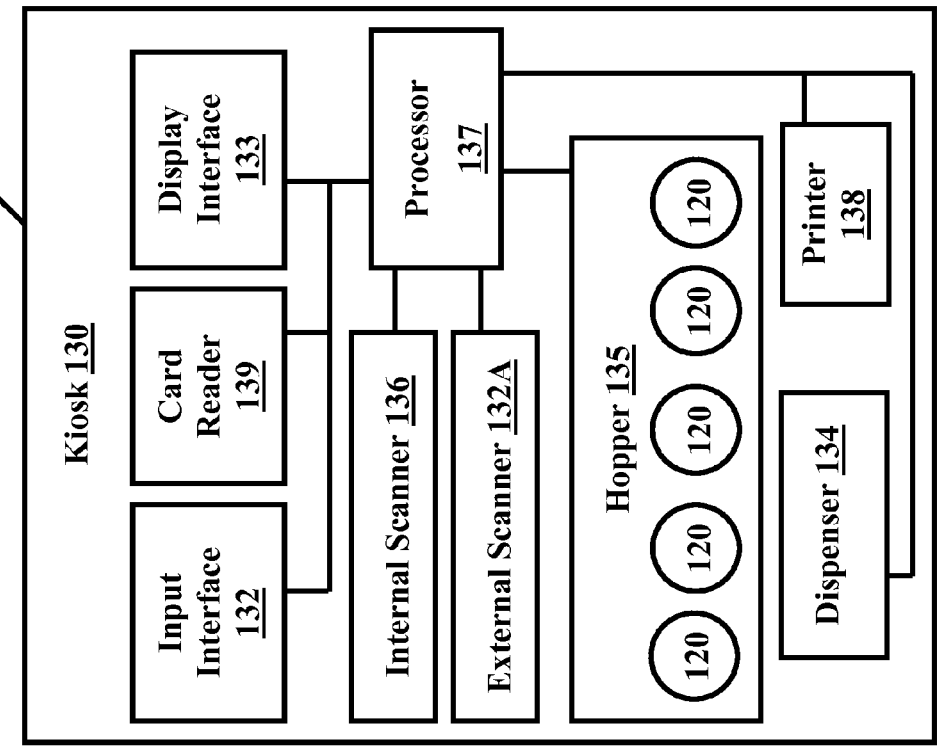
FIG. 6 is a block diagram of an example kiosk suitable for dispensing barcoded wristbands in accordance with the principles of the present disclosure.

FIG. 6 is a block diagram of an example kiosk 130 suitable for dispensing barcoded wristbands 120. The kiosk 130 includes a kiosk housing 131 including an input interface 132, a display interface 133, and a dispenser 134 through which wristbands 120 are dispensed. In various implementations, the input interface 132 includes a keypad, a mouse, a touch screen, a controller, buttons, and/or a microphone. The kiosk 130 also includes an external scanner 132A, such as an optical or a laser scanner. The external scanner 132A is configured to read the barcode 120 on the wristbands 120. In various implementations, the display interface 133 of the kiosk 130 includes a monitor or other type of display screen arrangement, a haptic screen, a speaker arrangement, and/or a printer.

A hopper 135 also is disposed in the housing 131. The hopper 135 is configured to hold multiple wristbands 120. In some implementations, the wristbands 120 in the hopper 135 include barcodes printed thereon that match barcodes stored at the account manager 110. However, the barcodes printed on the wristbands 120 in the hopper 135 are not yet activated at the account manager 110. In other implementations, the wristbands 120 in the hopper 135 do not include any barcode information yet. In still other implementations, the wristbands 120 in the hopper 135 may include activated barcodes printed thereon. The hopper 135 is connected to the dispenser 134 to selectively dispense the wristbands 120 in response to information entered into the input interface 132. An internal scanner 136 also is disposed in the housing 131. In some implementations, the internal scanner 136 is disposed at or adjacent the dispenser 134. In other implementations, the internal scanner 136 is disposed adjacent the hopper 135. In one example implementation, the internal scanner 136 is an optical scanner. In another example implementation, the internal scanner 136 is a laser scanner.

In some implementations, the user purchases a locker rental plan at the kiosk 130. For example, the user may use the input interface 132 to select a number of lockers to be rented, the type of each locker to be rented, a duration for which the locker will be accessible to the user, and the number of people who should have access to each locker. The various options available to the user are presented (e.g., visually, audibly, haptically) using the display interface 133. In some implementations, the kiosk 130 also includes an electronic card reader 139 disposed at the kiosk housing 131. The card reader 139 is configured to read a value-bearing card (e.g., a credit card, a debit card, a gift card, a voucher, etc.). In other implementations, the kiosk 130 is otherwise configured to accept money from a user (e.g., a coin slot, a dollar reader, a check reader, etc.).

In other implementations, the user redeems a voucher associated with a previously purchased plan 114 (e.g., by scanning a barcode or other identification indicator on the coupon or certificate at the user interface 132). For example, the user may purchase a locker rental plan 114 online via a park website and redeem the voucher for one or more wristbands at the kiosk 130. The user also may edit a previously purchased plan 114 at the kiosk 130 (e.g., to add another locker account 115, to increase the duration 119 for a particular account 115, to add another user to the plan 114, etc.).

The kiosk 130 also includes an electronic processor 137 disposed in the kiosk housing 131. The electronic processor 137 is configured to receive an order (a new order or an existing order) via the input interface 132 and to selectively dispense the wristbands 120 via the dispenser 134 in accordance with the order. The electronic processor 137 also is configured to scan a unique barcode 113 of each wristband 120 using the internal scanner 136 as the wristband 120 is dispensed. The electronic processor 137 communicates with the locker manager 110 to provide the scanned unique barcode 113 from the dispensed wristband 120 to activate the unique barcode 113. Generally, scanning a specific barcode 113 at an electronic locker 101 will not unlock a locker door 105 unless that specific barcode 113 has been activated in the locker manager 110.

In some implementations, the wristband dispensing kiosk 130 also includes a printer 138 disposed in the kiosk housing 131. The printer 138 prints or otherwise adds the respective unique barcode 113 to each wristband 120 as the wristband 120 is dispensed from the kiosk housing 131. In some implementations, the printer 138 adds visual indicia to the wristband that includes the barcode. In other implementations, the printer stores the barcode in an electronic memory included in the wristband 120. In some implementations, the processor 137 selects a barcode number from a locally stored list of available barcode numbers and provides the selected number to the printer 138. In other implementations, the processor 137 requests an available barcode number from the locker manager 110 and provides the requested barcode number to the printer 138.

FIG. 7 is a flowchart illustrating an operational flow for one example process 220 by which one or more barcoded wristbands 120 may be activated for use in renting locker terminals 101 in an electronic locker system 100. The activation process 220 begins at a start module 222, performs any appropriate initialization procedures, and proceeds to a first receive operation 224. During the first receive operation 224, the kiosk 130 receives information from a user via the user interface 132. For example, the processor 137 of the kiosk receives order information for a new rental plan or voucher information for an existing rental plan.

The information received includes a selection of a locker rental plan 114, a selection of a number of accounts 115 (e.g., the number of wristbands 120) to be associated with the locker rental plan 114, and payment information. As the term is used herein, the selection of a locker rental plan 114 includes a selection of a number of lockers 101 to be rented, a type of each locker 101 to be rented, a duration for each locker 101 to be rented, and a use indication for each locker 101 to be rented. If the plan 114 is being purchased at the kiosk 130, then the payment information includes an indication of how the user will be paying for the rental plan 114. If the plan was previously purchased, then the payment information includes an indication that payment has already been made.

A request operation 226 sends the information received from the user (e.g., via the input/output interface of the kiosk) to the locker manager 110 for approval. In some implementations, the locker manager 110 determines whether a sufficient number of lockers 101 are available to satisfy the requested plan 114. For example, in some implementations, the locker manager 110 may determine whether the requested number of lockers 101 of the requested type and/or size is available for purchase. In certain implementations, the locker manager 110 determines whether any lockers having the requested type and/or size of lockers are needed to satisfy purchased accounts set to activate during the requested time duration. In other implementations, the locker manager 110 may oversell lockers 101 (e.g., sell locker plans 114 that include more accounts 115 than there are available lockers 101) in accordance with an algorithm. In certain implementations, the locker manager 110 may oversell certain types of lockers (e.g., ride lockers) and not oversell other types of lockers (e.g., day lockers).

A second receive operation 228 receives the response from the locker manager 110 at the kiosk 130. The response indicates whether the requested locker plan 114 is approved. If the response indicates that the requested plan is not approved, then the kiosk 130 displays an error message to the user. For example, the kiosk 130 may indicate that the requested number, type, and/or size of lockers 101 are not available during the requested duration and/or at the requested location. In certain implementations, the kiosk 130 may offer an alternative plan 114 suggested by the locker manager 110 based on the requested plan 114. If the response indicates that the requested locker plan 114 is approved, however, then the activation process 220 proceeds to a dispense operation 230.

The dispense operation 230 outputs the selected number of wristbands 120 after payment has been made (e.g., by inserting money, by scanning a credit card, by scanning a voucher, etc.). Each wristband 120 has a unique barcode associated therewith. For example, in some implementations, each wristband 120 may include printed indicia providing the barcode or a representation thereof. In other implementations, the barcode may be otherwise stored on the wristband 120 (e.g., stored electronically in memory disposed in the wristband 120). In some implementations, the barcode is added to the wristbands 120 as the wristbands 120 are being dispensed. For example, a printer 138 may be disposed between the hopper 135 and the dispenser to print the barcodes after the wristbands 120 leave the hopper 135.

A scan operation 232 reads the unique barcode of each wristband 120 as the wristband 120 is dispensed during the dispense operation 226. For example, the internal scanner 136 may be disposed between the hopper 135 and the dispenser 134 (e.g., downstream from the printer 138). Accordingly, the barcodes of the wristbands 120 may be read as the wristbands 120 pass by the internal scanner 136 between the hopper 135 and the dispenser 134.

During a send operation 234, the kiosk 130 communicates with the locker manager 110 to provide an indication that a particular barcode has been dispensed and should be considered activated by the locker manager 110. In some implementations, the kiosk 130 sends the details of the purchased locker rental plan to the locker manager 110 so that the locker manager 110 may associate the locker rental plan 114 with the barcode(s) 113.

The activation process 220 performs any appropriate completion procedures and ends at a stop module 236.

Figure 8:
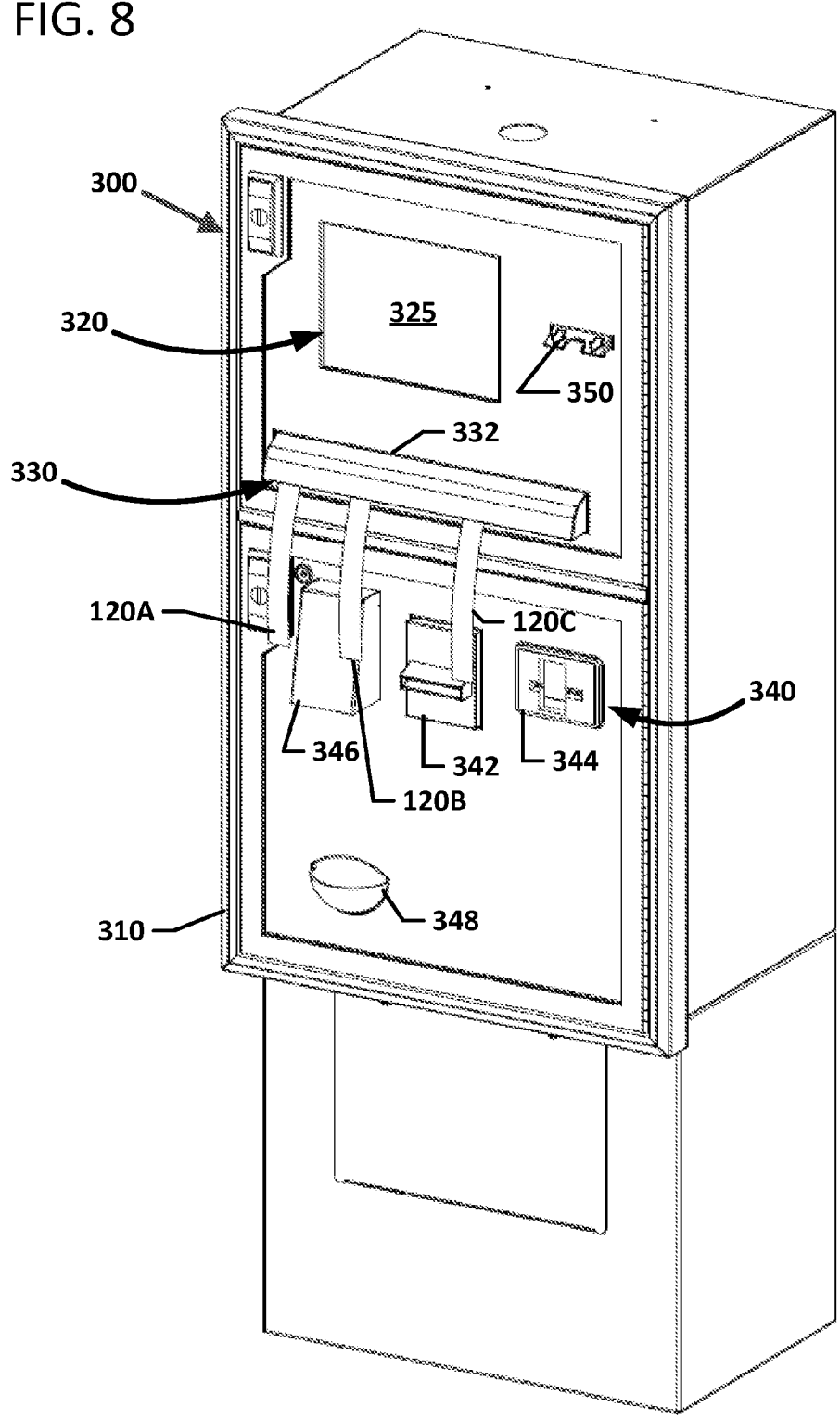
FIG. 8 illustrates an example kiosk including a kiosk housing having an input/output region and a dispensing region.

FIG. 8 illustrates an example kiosk 300 including a kiosk housing 310 having an input/output region 320 and a dispensing region 330. The kiosk housing 310 also defines a payment region 340. The input/output region 320 includes a display screen and an input interface. In the example shown, the input/output region 320 includes a touchscreen 325 via which users may enter input and receive output. One or more users may utilize the touch screen display interface 320 to purchase, modify, or cancel a locker plan. In other implementations, the input/output region 320 may include input controls that are separate from the display screen (e.g., buttons, keypad, mouse, keyboard, microphone, etc.).

Figure 9:
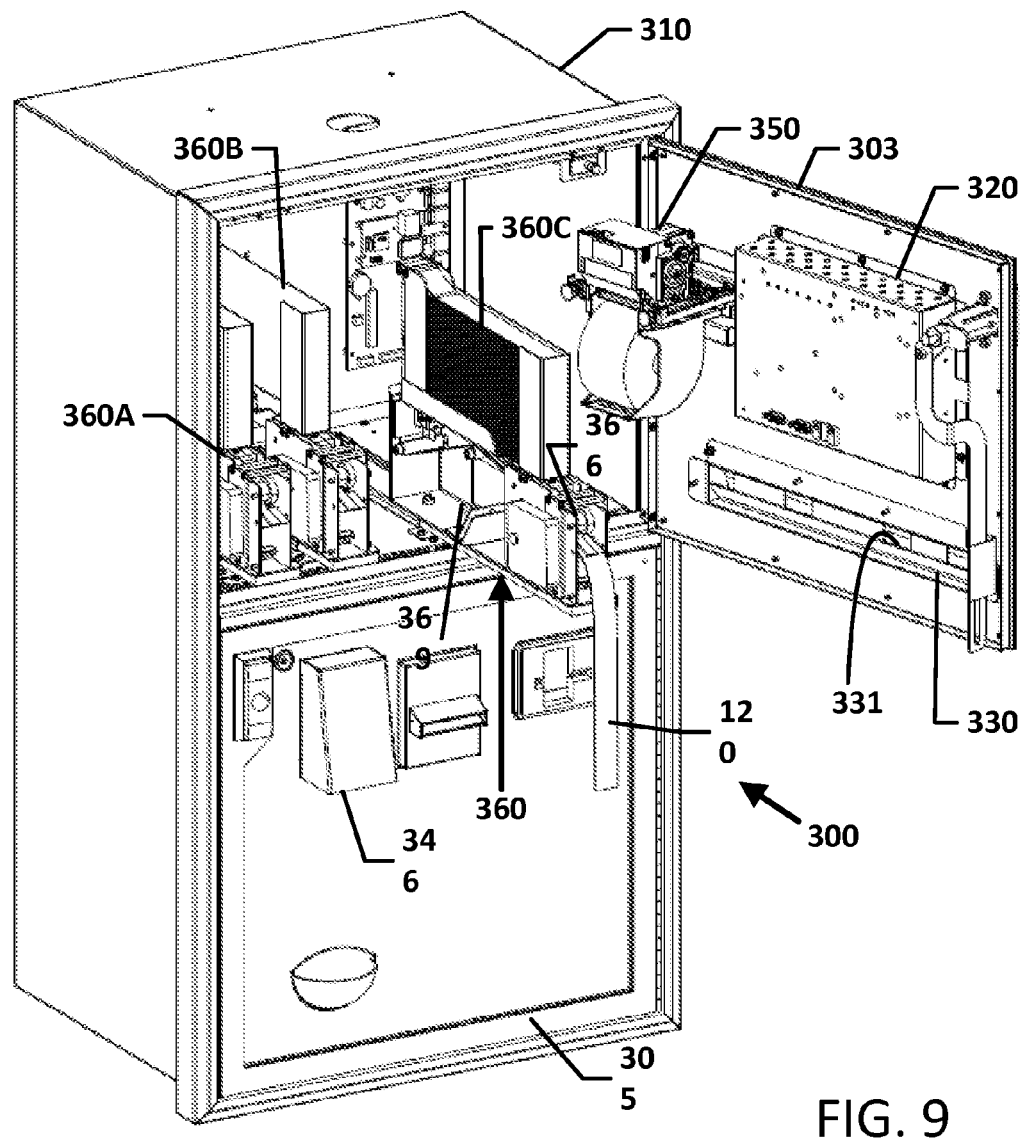
FIG. 9 illustrates the example kiosk of FIG. 8 in a partially open position so that the discharge devices are visible.

The dispensing region 330 defines at least one slot 331 through which one or more wristbands 120 are meted out from an interior of the kiosk housing 310. In some implementations, one or more discharge devices 360 are aligned with the slot 331 (see FIG. 9). In certain implementations, each discharge device 360 is aligned with a corresponding slot 331 (FIG. 9). In other implementations, an elongated slot 331 may span two or more of the discharge devices 360. In the example shown in FIG. 8, a guide 332 is positioned over the slots 331 to direct the wristbands 120 downwardly. In certain implementations, the guide 332 also inhibits unauthorized access to the discharge devices 360 through the slot 331.

The kiosk housing 310 also has a payment region 340 including one or more payment acceptors. In the example shown, the kiosk housing 310 include a bill acceptor 342 and a card acceptor 344. The bill acceptor 342 is configured to receive paper money. The card acceptor 344 is configured to receive credit cards, debit cards, gift cards, membership cards, or other value bearing and/or identifying instruments. A coin tray 348 may be provided to allow the kiosk to dispense change. Some types of kiosk housings 310 also include a scanner 346 (e.g., an optical scanner, a laser scanner, etc.) that is configured to read codes (e.g., bar codes, QR codes, alphanumeric codes, etc.) on coupons, receipts, purchase slips, or other media bearing readable codes.

A receipt dispenser 350 may print out a receipt for the user when the wristbands 120 are dispensed and/or when a refund is issued. As shown in FIG. 9, the receipt dispenser 350 includes a printer and a paper hopper on which the receipts may be printed. In certain implementations, the receipt dispenser 350 is located near the input/output regions 320. In other implementations, the receipt dispenser 350 is located closer to the payment region 340.

Figure 10:
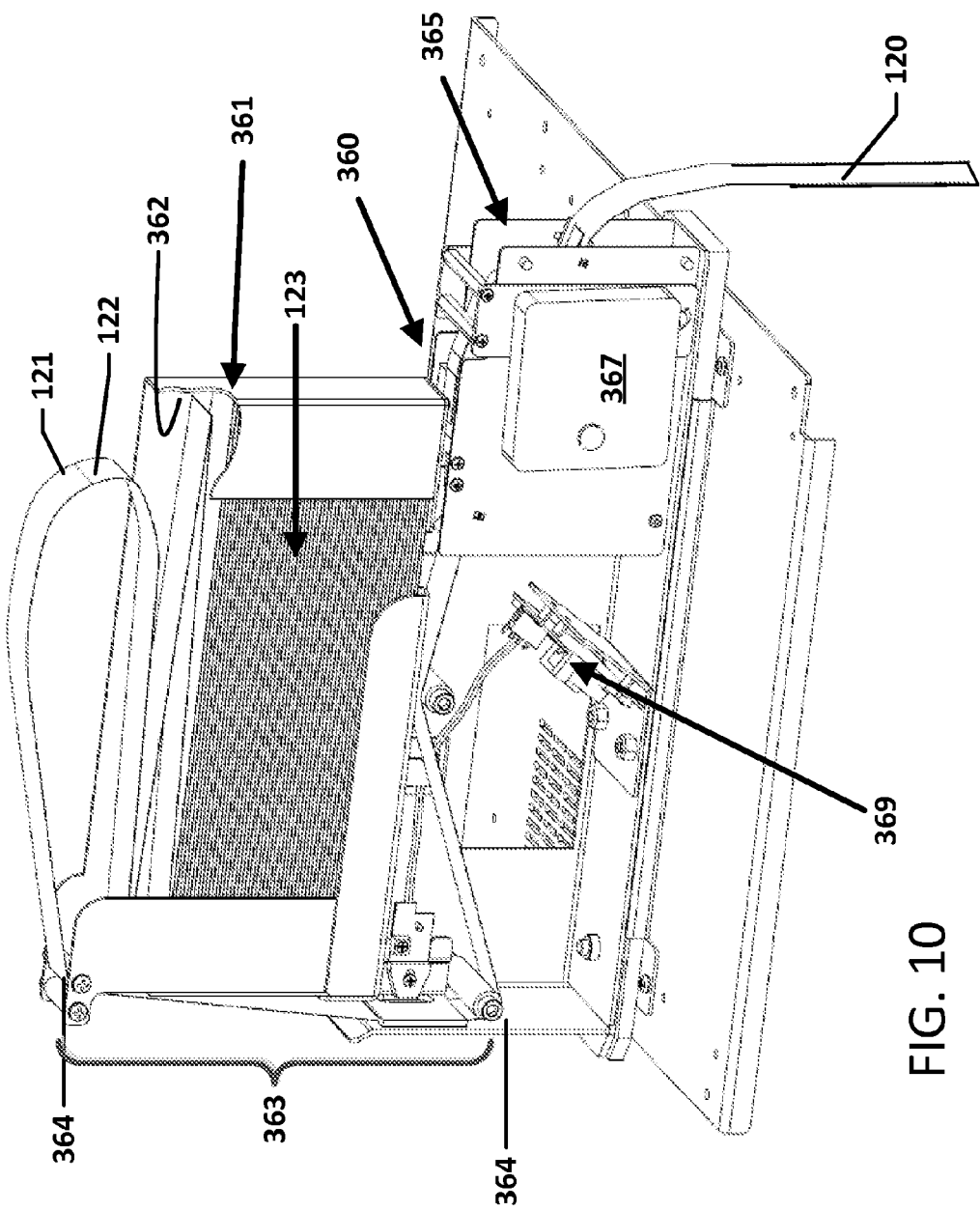
FIG. 10 illustrates one example discharge device suitable for use in any of the kiosks disclosed herein.

FIG. 10 illustrates one example discharge device 360 suitable for use in any of the kiosks disclosed herein. The example discharge device 360 includes a hopper 361 and a dispenser 365. The hopper 361 defines a storage chamber 362 in which one or more wristbands 120 may be kept until being dispensed to a user. A guiding arrangement 363 directs the wristbands 120 from the storage chamber 362 to the dispenser 365.

In some implementations, the hopper 361 is configured to hold fanfold wristbands 120. Fanfold wristbands 120 include an elongated web 121 of wristbands 120 connected end-to-end. The web 121 is scored, perforated, or otherwise weakened at the end-to-end connection 122 between adjacent wristbands 120. The web 121 is folded at the weakened connection area 122. In the example shown, the hopper 361 is shaped and sized so that the web 121 is stacked one wristband 120 on top of each other so that each layer of the stack 123 includes a single wristband 120. In other implementations, however, the hopper 361 may be sized so that each layer of the stack 123 includes multiple wristbands 120.

In some implementations, the dispenser 365 is configured to pull the wristbands 120 from the hopper 361. For example, the dispenser 365 may include a motorized or otherwise electronically moveable roller 366 that increments the web 121 of wristbands 120 towards the respective slot 331. The dispenser includes a processor or other electronic controller 367 to manage the roller 366. The dispenser 365 also may include an internal scanner 369 (FIGS. 9 and 10) that reads the indicia printed on the wristbands 120 as the wristband is dispensed.

As shown in FIGS. 8 and 9, the kiosk housing 310 may hold multiple discharge devices 360 (e.g., arranged side-by-side within the housing 310). In some implementations, one or more of the discharge devices 360 is configured to hold a different type of wristband 120 than another of the discharge devices 360. For example, the discharge device 360 may hold a wristband 120 having a different color, a different size, or an otherwise different appearance than a wristband 120 of another discharge device 360. In certain implementations, each kiosk includes at least two discharge devices 360 for each type of wristband 120 for redundancy purposes.

Each type of wristband 120 may be associated with a specific type of locker. For example, various color wristbands 120 may indicate different locker sizes (e.g., small, medium, large), different locker locations (front of park, rear of park, etc.), and/or different types of lockers (day locker, ride locker, water park locker, etc.). Certain example wristbands 120 may be sized to fit a child's wrist. In some implementations, the kiosk 300 is stocked to provide multiple types of wristbands 120. In the example shown in FIG. 8, a first wristband 120A, a second wristband 120B, and a third wristband 120C are being dispensed. In some implementations, one or more of the wristbands 120A, 120B, 120C may have a different color or size than the others. In other implementations, each of these wristbands 120 may have the same size and appearance and are dispensed simultaneously for efficiency.

In some implementations, the dispensing region 330 of the kiosk housing 310 is separated from the payment region 340. In the example shown in FIG. 9, a first door 303 of the kiosk housing 310 may open to provide access to the discharge devices 360 of the kiosk 300 without providing access to any money received at the payment region 340. A separately locked second door 305 of the kiosk housing 310 provides access to the collected money. This separation facilitates replenishing the wristbands 120 when the kiosk runs low without sacrificing security.

Figure 11:
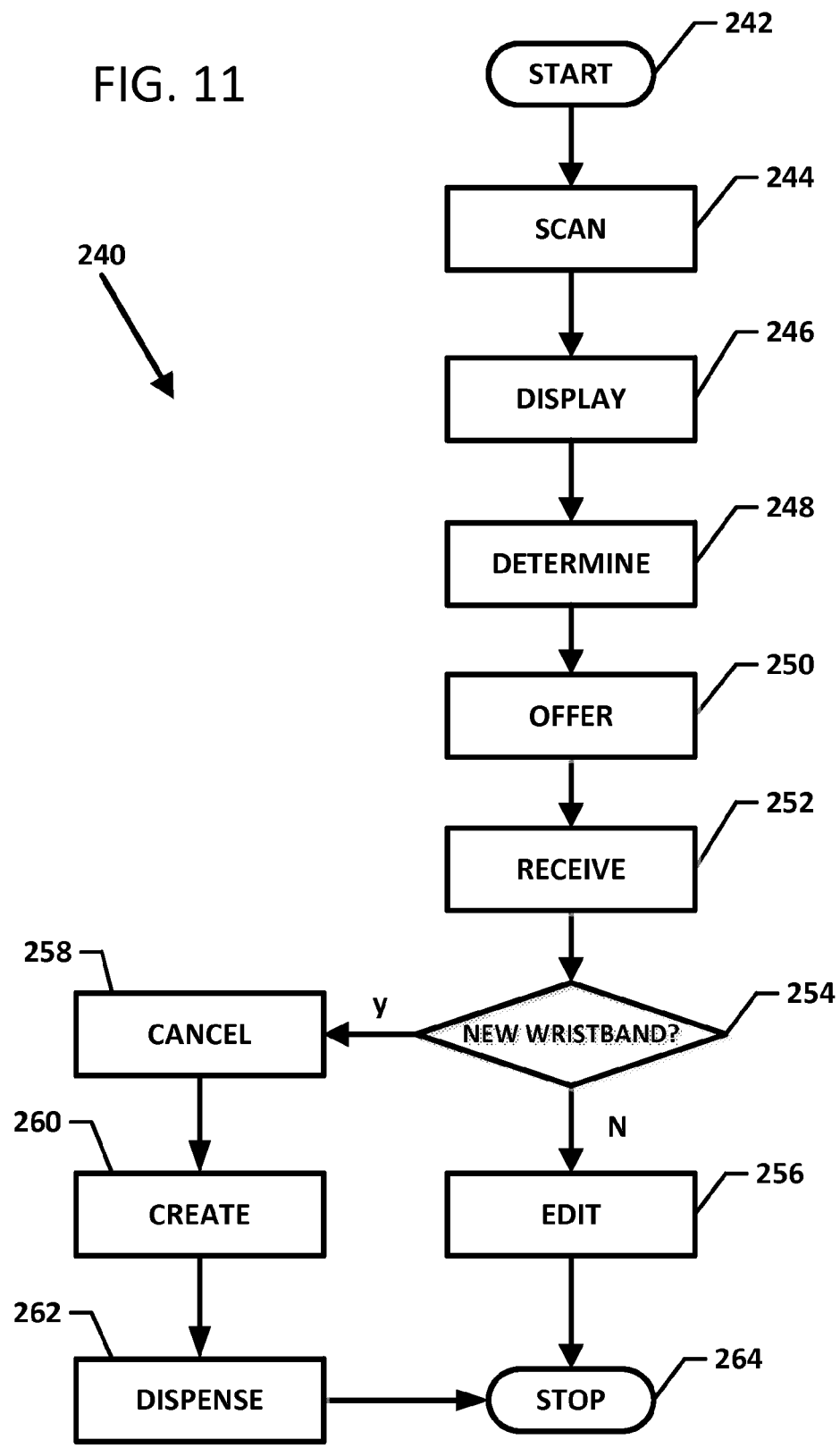
FIG. 11 is a flowchart illustrating an operational flow for an upgrade process that may be implemented at any of the kiosks disclosed herein.

FIG. 11 is a flowchart illustrating an operational flow for an upgrade process 240 that may be implemented at any of the kiosks disclosed herein. The upgrade process 240 begins at a start module 242, performs any appropriate initialization procedures, and proceeds to a scan operation 244. During the scan operation 244, a user scans a wristband 120 at a barcode scanner (e.g., scanner 346 of FIG. 8) to enter the wristband code at the kiosk.

A display operation 246 presents the rental plan 114 and/or use history associated with the wristband 120 to the user. For example, the terms of the plan 114 may be displayed on touch screen 325 of kiosk 300 of FIG. 8. The kiosk may display the number of lockers 101 accessed under the plan 114, the number of times the lockers 101 were accessed, and/or the remaining duration for the plan 114. The display operation 246 also may indicate whether any additional lockers 101 may be accessed under the plan 114.

In some implementations, the kiosk only presents offers that are available. For example, during a determine operation 248, the kiosk may communicate with the locker manager 110 to determine whether larger lockers are available, whether the rented locker 101 is available past the time the plan 114 is set to expire, whether additional lockers are available, whether a priority locker is available, etc. An offer operation 248 presents to the user an option to upgrade the account 115 or plan 114 associated with the scanned wristband 120. In some implementations, the kiosk will display only upgrade options that may be fulfilled based on the determine operation 248. In other implementations, the kiosk presents all upgrade options without first checking to see which are possible to implement at any given time.

For example, during the offer operation 250, the kiosk may display an icon or other indicia to the user via the kiosk display (e.g., touchscreen 325 of FIG. 8). The offer operation 248 may indicate the ways in which the user may upgrade the account 115 or plan 114. For example, the offer operation 248 may present an option to increase the size of the locker 101 associated with the account 115, to increase the duration associated with the account 115, to add another account 115 to the plan 114, etc. In some implementations, the offer operation 248 may indicate a cost associated with upgrading the plan 114.

A receive operation 252 obtains input from the user indicating that the user wishes to upgrade the plan 114. For example, the receive operation 252 may obtain input from the user indicating that the user wishes to increase a size of a locker 101 associated with an existing account 115 (e.g., from a small to a medium or large). The receive operation 252 may obtain input from the user indicating that the user wishes to increase the amount of time for which the locker 101 is rented. The receive operation 252 may obtain input from the user indicating that the user wishes to rent another locker 101. In certain implementations, the receive operation 252 may obtain payment from the user for the upgrade.

A determination module 254 determines whether a new wristband 120 should be dispensed for the requested upgrade. For example, a new wristband 120 may be dispensed if the wristbands 120 are color-coded based on an upgraded feature (e.g., size, type, location, etc.). If the determination module 254 determines that a new wristband 120 should not be dispensed, then the kiosk communicates with the locker manager 110 during an edit operation 256 to change one or more details associated with the rental plan 114 maintained by the locker manager 110. The upgrade process 240 performs any appropriate completion procedures and ends at a stop module 264.

If the determination module 254 determines that a new wristband 120 should be dispensed, however, then the kiosk communicates with the locker manager 110 during a cancel operation 258 to disassociate the code on the user's current wristband 120 with the locker plan 114. In certain implementations, the locker manager 110 deletes the plan 114 entirely. The locker manager 110 creates a new plan 114 including the upgraded features and associates a new code with the new plan 114 during a create operation 260. In certain implementations, the locker manager 110 creates the new plan 114 by modifying the old plan 114. In other implementations, the locker manager 110 treats the upgrade request as a brand new request for a locker rental plan 114.

A dispense operation 262 causes the kiosk to output one or more replacement wristbands 120 that include codes associated with the new plan 114. In certain implementations, the replacement wristbands 120 have a different appearance (e.g., color) from the user's previous wristbands 120. The upgrade process 240 performs any appropriate completion procedures and ends at a stop module 264. The operations of the upgrade process 240 disclosed above need not be implemented in a particular order. For example, in some implementations, the kiosk may determine whether or not an upgrade is available after receiving an upgrade selection from the user (e.g., after receive operation 252).

In some implementations, the upgrade process 240 may be performed by a service attendant, customer service representative, or other facility employee. In certain implementations, the facility employee may perform the upgrade process 240 at the kiosk. In other implementations, the facility employee may perform the upgrade process 240 at the locker bank (e.g. via a local bank managing system) after providing an authorization code. In other implementations, the facility employee may perform the upgrade process 240 (e.g., using a computer or terminal) at a customer service booth, office, or other such location. In certain implementations, the facility employee may have the option of overriding the charges for the upgrade.

Figure 12:
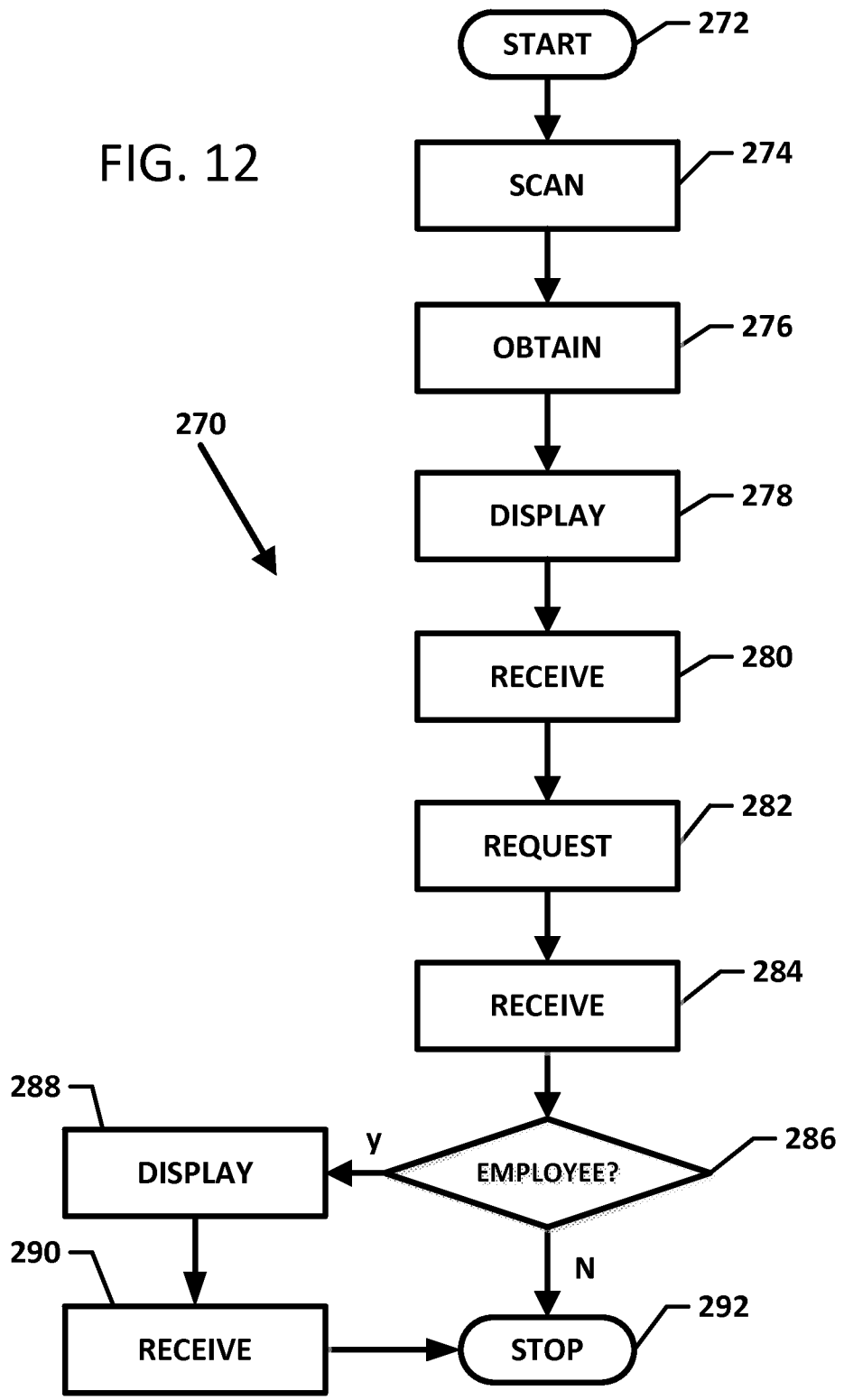
FIG. 12 is a flowchart illustrating an operational flow for an exchange process by which a user may select a different locker than the one assigned or previously selected.

FIG. 12 is a flowchart illustrating an operational flow for an exchange process 270 by which a user may select a different locker than the one assigned or previously selected. The exchange process 270 may be implemented at any of the kiosks disclosed herein, the locker bank 109, or a customer service booth or other such facility. For convenience, the exchange process 270 will be described as occurring at a kiosk. The exchange process 270 begins at a start module 272, performs any appropriate initialization procedures, and proceeds to a scan operation 274.

During the scan operation 274, a user scans a wristband 120 at a barcode scanner (e.g., scanner 346 of FIG. 8) to enter the wristband code at the kiosk. During an obtain operation 276, the kiosk communicates the scanned code to the locker manager 110 to determine a status of the account associated with the code. For example, the kiosk may receive information from the locker manager 110 indicating whether a specific locker 101 is associated with the code, whether the locker 101 has been accessed, and whether the duration for which the locker 101 was rented has expired.

A display operation 278 presents the account status to the user. For example, the details of the locker rental plan associated with the wristband code and the usage history of the wristband (e.g., where scanned) and/or of associated lockers (e.g., when accessed) may be displayed to the user (e.g., via touch screen 325 of kiosk 300 of FIG. 8). Various options also may be displayed to the user. For example, an option to upgrade the locker may be displayed as described above. An option to exchange an associated locker 101 for another locker also may be displayed. In some implementations, the exchange option is displayed only if the associated locker 101 has not been accessed. In other implementations, the exchange option is displayed only if sufficient time remains on the plan 114 (e.g. sufficient time to obtain and utilize a different locker).

A receive operation 280 obtains input from the user selecting the exchange option. For example, the receive operation 280 may sense a user touching an icon on a touchscreen, may determine an appropriate button or sequence of buttons has been pressed, or otherwise received instructions from the user to select the exchange option. In some implementations, the receive operation 280 also receives a selection of a new locker 101 for which the associated locker 101 is being exchanged.

A request operation 282 communicates with the locker manager 110 to determine whether another locker 101 meeting the plan limitations and privileges is available. In some implementations, the request operation includes a request for a particular locker 101. When the locker manager 110 receives the request, the locker manager 110 determines whether any lockers 101 of the appropriate type (e.g., meeting the features of the purchased rental plan 114) are available. If the request included the identification of a particular locker 101, then the locker manager 110 may determine whether the particular locker 101 is available and is in accordance with the plan 114.

If the locker manager 110 decides to deny the request, then a second receive operation 284 receives the denial and presents the denial to the user. If the locker manager 110 authorizes the request, however, then the locker manager 110 resets the account 115. In some implementations, disassociates the previously associated locker 101 from the account 115 and/or code of the wristband 120. In such implementations, the second receive operation 284 informs the user that the account has been reset. The user may now select a new locker 101 by scanning the wristband at the locker 101 or bank 109. In certain implementations, the locker manager 110 associates a requested locker 101 with the account 115. In such implementations, the second receive operation 284 displays the identity and location of the new locker 101 to the user.

A determination module 286 determines whether the exchange request was performed by a user or by a facility employee (e.g., service attendant, customer service representative, etc.). For example, in some implementations, the determination module 286 may determine whether an employee authorization code has been entered (e.g., manually typed, scanned, etc.). In other implementations, the determination module 286 may determine whether the exchange operation 270 is being implemented at a kiosk, a locker bank 109, or a customer service booth.

If the exchange request was performed by the user, then the exchange process 270 performs any appropriate completion procedures and ends at a stop module 292. If the exchange request was performed by an employee, however, then another display operation 288 presents an option to block the locker 101 (e.g., for cleaning or other maintenance). Another receive operation 290 obtains a selection from the employee of whether to block the previously associated locker 101 from being purchased/accessed. If the employee chooses to block the locker 101, then the kiosk communicates the selection to the locker manger 110.

The exchange process 270 performs any appropriate completion procedures and ends at a stop module 292. In other implementations, the process to block a locker may be wholly separate from the exchange process 270. In certain implementations, a user is not charged for exchanging lockers. In other implementations, however, the user may provide payment at the kiosk to purchase an exchange. In certain implementations, a new wristband 120 is not dispensed since the newly associated locker 101 is the same type/size/etc. as the previous locker 101. In other implementations, however, a new wristband 120 may be dispensed.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A locker system comprising:
   a plurality of lockers, each locker including an enclosure defining an interior that is accessible through an access opening, each locker including a door that is configured to move between a closed position and an open position, the door inhibiting access to the enclosure interior when in the closed position and the door enabling access to the enclosure interior through the access opening when in the open position, each locker also including a door lock, the door lock of each locker being configured to releasably retain the respective door in the closed position;
   at least one barcode scanner, the barcode scanner being operationally coupled to the door lock of at least one locker to selectively unlock the door;
   a locker manager coupled to each of the lockers via an electronic network, the locker manager including a processor and memory, the memory of the locker manager storing a plurality of unique barcodes and storing a plurality of rental plans, each rental plan including at least one unique locker account, wherein a locker account of a first rental plan is associated with a first of the lockers and with at least two of the unique barcodes so that scanning either of the two unique barcodes at the barcode scanner releases the door lock of the first locker;
   a plurality of wristbands, each wristband being configured to store one of the unique barcodes to enable scanning of the respective barcode at the barcode scanner; and
   at least one kiosk electronically coupled to the locker manager, the kiosk including a hopper configured to hold at least some of the wristbands, a dispenser connected to the hopper to dispense the wristbands, and a barcode scanner that scans the unique barcode of each wristband as the wristband is dispensed and provides data from the scan to the locker manager which activates the barcode thereby allowing a user to select one of the lockers for association and to access the interior of the associated locker.

2. The locker system of claim 1, wherein the locker manager stores a unique terminal ID for each of the lockers, and wherein the locker manager associates the first locker account with the unique terminal ID of the first locker after one of the two unique barcodes is scanned at the barcode scanner.

3. The locker system of claim 1, wherein the first locker account is part of a first rental plan stored in the memory of the locker manager, and wherein the first rental plan includes a second locker account for another of the lockers.

4. The locker system of claim 3, wherein the second locker account is associated with another unique barcode.

5. The locker system of claim 3, wherein the second locker account is associated with one of the two unique barcodes associated with the first locker account.

6. The locker system of claim 1, wherein the at least one barcode scanner includes a plurality of barcode scanners, and wherein each of the barcode scanners is associated with the door lock of a respective one of the lockers.

7. The locker system of claim 1, wherein the plurality of lockers includes at least one bank of lockers, wherein the barcode scanner is configured to operate the door lock of each locker in the bank.

8. The locker system of claim 1, wherein the two unique barcodes are initially associated with the locker account when the first rental plan is created.

9. The locker system of claim 1, wherein a first of the two unique barcodes is initially associated with the first locker account and wherein a second of the two unique barcodes is associated with the first locker account when the first rental plan is edited.

10. The locker system of claim 1, wherein each locker account is associated with payment for one of the lockers.

11. The locker system of claim 1, wherein the processor of the locker manager is configured:
   to associate at least some of the unique barcodes with privileges that provide priority to obtain lockers having particular physical aspects;
   to receive activation requests for locker access, each request for locker access being associated with a particular one of the lockers and one of the barcodes;
   to deny access to any of the lockers having a particular physical aspect when a barcode associated with the respective request for the locker is not associated with the privilege providing priority to obtain a locker having the particular physical aspect; and
   to provide access to any of the lockers having a particular physical aspect when a barcode associated with the respective request for the locker is associated with the privilege providing priority to obtain a locker having the particular physical aspect.

12. The locker system of claim 11, wherein the physical aspects include a location of each of the lockers; and wherein one of the privileges includes priority to obtain a locker located close to ground.

13. The locker system of claim 11, wherein the physical aspects include a location of each of the lockers; and wherein one of the privileges includes priority to obtain a locker located in a desirable area.

14. The locker system of claim 11, wherein the physical aspects include a size of each of the lockers; and wherein one of the privileges includes priority to obtain a large size locker.

15. The locker system of claim 11, wherein the physical aspects include whether each of the lockers; and wherein one of the privileges includes priority to obtain a locker that meets ADA specifications.

* * * * *